(12) United States Patent
Ghasemi et al.

(10) Patent No.: US 12,391,845 B2
(45) Date of Patent: Aug. 19, 2025

(54) POLYURETHANE-BASED ICE-SHEDDING COATINGS

(71) Applicant: Elemental Coatings LLC, Houston, TX (US)

(72) Inventors: Hadi Ghasemi, Spring, TX (US); Brian Huskinson, Houston, TX (US); Sahar Qavi, Sugar Land, TX (US)

(73) Assignee: Elemental Coatings LLC, Houston, TX (US)

( * ) Notice: Subject to any disclaimer, the term of this patent is extended or adjusted under 35 U.S.C. 154(b) by 885 days.

(21) Appl. No.: 17/579,351

(22) Filed: Jan. 19, 2022

(65) Prior Publication Data

US 2022/0228022 A1   Jul. 21, 2022

Related U.S. Application Data

(60) Provisional application No. 63/139,604, filed on Jan. 20, 2021.

(51) Int. Cl.
*C09D 175/04* (2006.01)
*C09K 3/10* (2006.01)

(52) U.S. Cl.
CPC .............. *C09D 175/04* (2013.01); *C09K 3/10* (2013.01); *C09K 2003/1081* (2013.01)

(58) Field of Classification Search
CPC ........... C08L 83/04; C08L 75/04; C08K 5/09; C09D 183/04; C09D 175/04
See application file for complete search history.

(56) References Cited

U.S. PATENT DOCUMENTS

2005/0215654 A1* 9/2005 Wright ................. C09D 175/04
522/6

FOREIGN PATENT DOCUMENTS

WO    2016176350 A1    11/2016
WO    2019079140 A1    4/2019

OTHER PUBLICATIONS

International Search Report and Written Opinion for PCT Application No. PCT/US2022/013131 mailed May 11, 2022 (pp. 11).
(Continued)

*Primary Examiner* — Robert C Boyle
(74) *Attorney, Agent, or Firm* — Fletcher Yoder P.C.

(57) ABSTRACT

Winter icing can adversely impact transportation systems (aircrafts, drones, trains, etc.), infrastructure, and energy systems, among many other things. Existing ice-shedding coatings generally suffer from low durability under various mechanical, chemical, and environmental stresses. The polyurethane-based, stress-localized ice-shedding coatings described herein present a novel material paradigm to develop highly durable ice-shedding coatings capable of withstanding harsh aerospace and other industrial conditions. By optimizing the chemical composition and processing of the coating, a uniform, highly durable, polyurethane-based ice-shedding coating has been achieved that can be applied to a variety of surfaces. These coatings have been comprehensively tested, including ice adhesion strength measurements, ice-shedding capabilities in an icing wind tunnel, and a set of mechanical, chemical and environmental durability tests. These ice-shedding surfaces promise a feasible approach to address long-standing icing problems in aircrafts, drones, off-shore wind-turbines and other types of equipment and infrastructure.

20 Claims, 10 Drawing Sheets

(56) References Cited

OTHER PUBLICATIONS

Andersson, A. K. & Chapman, L., "The impact of climate change on winter road maintenance and traffic accidents in West Midlands," UK. Accid. Anal. Prev. 43, 284-289 (2011).
Antonini, C., Innocenti, M., Horn, T., Marengo, M. & Amirfazli, A., "Understanding the effect of superhydrophobic coatings on energy reduction in anti-icing systems," Cold Reg. Sci. Technol. 67, 58-67 (2011).
Arctic Council. Arctic Marine Infrastructure. Arctic Marine Shipping Assessment 2009 Report (2009).
Cao, L., Jones, A. K., Sikka, V. K., Wu, J. & Gao, D., "Anti-Icing superhydrophobic coatings," Langmuir 25, 12444-12448 (2009).
Chavan, S., Carpenter, J., Nallapaneni, M., Chen, J. Y. & Miljkovic, N., "Bulk water freezing dynamics on superhydrophobic surfaces," Appl. Phys. Lett. 110, (2017).
Dalili, N., Edrisy, A. & Carriveau, R, "A review of surface engineering issues critical to wind turbine performance," Renew. Sustain. Energy Rev. 13, 428-438 (2009).
Eberle, P., Tiwari, M. K., Maitra, T. & Poulikakos, D., "Rational nanostructuring of surfaces for extraordinary icephobicity," Nanoscale 6, 4874-81 (2014).
Eslami, B. et al., "Stress-localized durable anti-biofouling surfaces," Soft Matter 15, 6014-6026 (2019).
Future Markets, "The Global Market for Ice-Resistant Coatings and Surfaces: Applications, production and producers," https://www.futuremarketsinc.com/category/all-reports/ (2019).
Gam-Derouich, S. et al., "Micro-patterned anti-icing coatings with dual hydrophobic/hydrophilic properties," J. Mater. Chem. A 19353-19357 (2018) doi:10.1039/C8TA06944A.
Gent, R. W., Dart, N. P. & Cansdale, J. T., "Aircraft Icing," Phil. Trans. R. Soc. Lond. 358, 2873-2911 (2000).
Golovin, K. et al., "Designing durable icephobic surfaces," Sci. Adv. 2, 1-12 (2016).
Golovin, K., Dhyani, A., Thouless, M. D. & Tuteja, A., "Low-interfacial toughness materials for effective large-scale deicing," Science (80-. ). 364, 371-375 (2019).
Irajizad, P., Hasnain, M., Farokhnia, N., Sajadi, S. M. & Ghasemi, H., "Magnetic slippery extreme icephobic surfaces," Nat. Commun. 7, 13395 (2016).
Irajizad, P. et al., "Stress-localized durable icephobic surfaces," Mater. Horizons 6, 758-766 (2019).
Irajizad, P., Nazifi, S. & Ghasemi, H., "Icephobic surfaces: Definition and figures of merit," Adv. Colloid Interface Sci. 269, 203-218 (2019).
Jia, Z., DeLuca, C. I., Chao, H. & Davies, P. L., "Structural basis for the binding of a globular antifreeze protein to ice," Nature 384, 285-8 (1996).
Jiang, X., Zhao, J., Luo, B., Zhang, J. & Huang, C., "Survey and Analysis of Ice Accidents of Early 2008 in Southern China," in IWAIS XIII (2009).
Jung, S. et al., "Are superhydrophobic surfaces best for icephobicity?," Langmuir 27, 3059-3066 (2011).
Jung, S., Tiwari, M. K., Doan, N. V. & Poulikakos, D., "Mechanism of supercooled droplet freezing on surfaces," Nat. Commun. 3, 615 (2012).
Kreder, M. J., Alvarenga, J., Kim, P. & Aizenberg, J., "Design of anti-icing surfaces: smooth, textured or slippery?," Nat. Rev. Mater. 1, 15003 (2016).
Laforte, J. L., Allaire, M. a. & Laflamme, J., "State-of-the-art on power line de-icing," Atmos. Res. 46, 143-158 (1998).
Lafuma, A. & Quéré, D., "Slippery pre-suffused surfaces," EPL (Europhysics Lett. 96, 56001 (2011).
Liou, Y. C., Tocilj, a, Davies, P. L. & Jia, Z., "Mimicry of ice structure by surface hydroxyls and water of a beta-helix antifreeze protein," Nature 406, 322-324 (2000).
Machielsen, C. H. M. & Kerschbaumer, H. G., "Influence of frost formation and defrosting on the performance of air coolers: standards and dimensionless coefficients for the system designer," Int. J. Refrig. 12, 283-290 (1989).
Marwitz, J. et al., "Meteorological Conditions Associated with the ATR72 Aircraft Accident near Roselawn, Indiana, on Oct. 31, 1994," Bull. Am. Meteorol. Soc. 78, 41-52 (1997).
Miljkovic, N., Enright, R. & Wang, E. N., "Liquid Freezing Dynamics on Hydrophobic and Superhydrophobic Surfaces," Trans. ASME 134, 080902 (2012).
Miljkovic, N., Preston, D. J., Wang, E. N. & Enright, R., Ostwald Ripening During Freezing on Scalable Superhydrophobic Surfaces, J. Heat Transfer 136, 080901 (2014).
Sojoudi, H., McKinley, G. H. & Gleason, K. K., "Linker-free grafting of fluorinated polymeric cross-linked network bilayers for durable reduction of ice adhesion," Mater. Horiz. 2, 91-99 (2015).
Sojoudi, H. et al., "Scalable and durable polymeric icephobic and hydrate-phobic coatings," Soft Matter 14, 3443-3454 (2018).
Subramanyam, S. B., Rykaczewski, K. & Varanasi, K. K., "Ice adhesion on lubricant-impregnated textured surfaces," Langmuir 29, 13414-13418 (2013).
Wong, T.-S. et al., "Bioinspired self-repairing slippery surfaces with pressure-stable omniphobicity," Nature 477, 443-447 (2011).

* cited by examiner

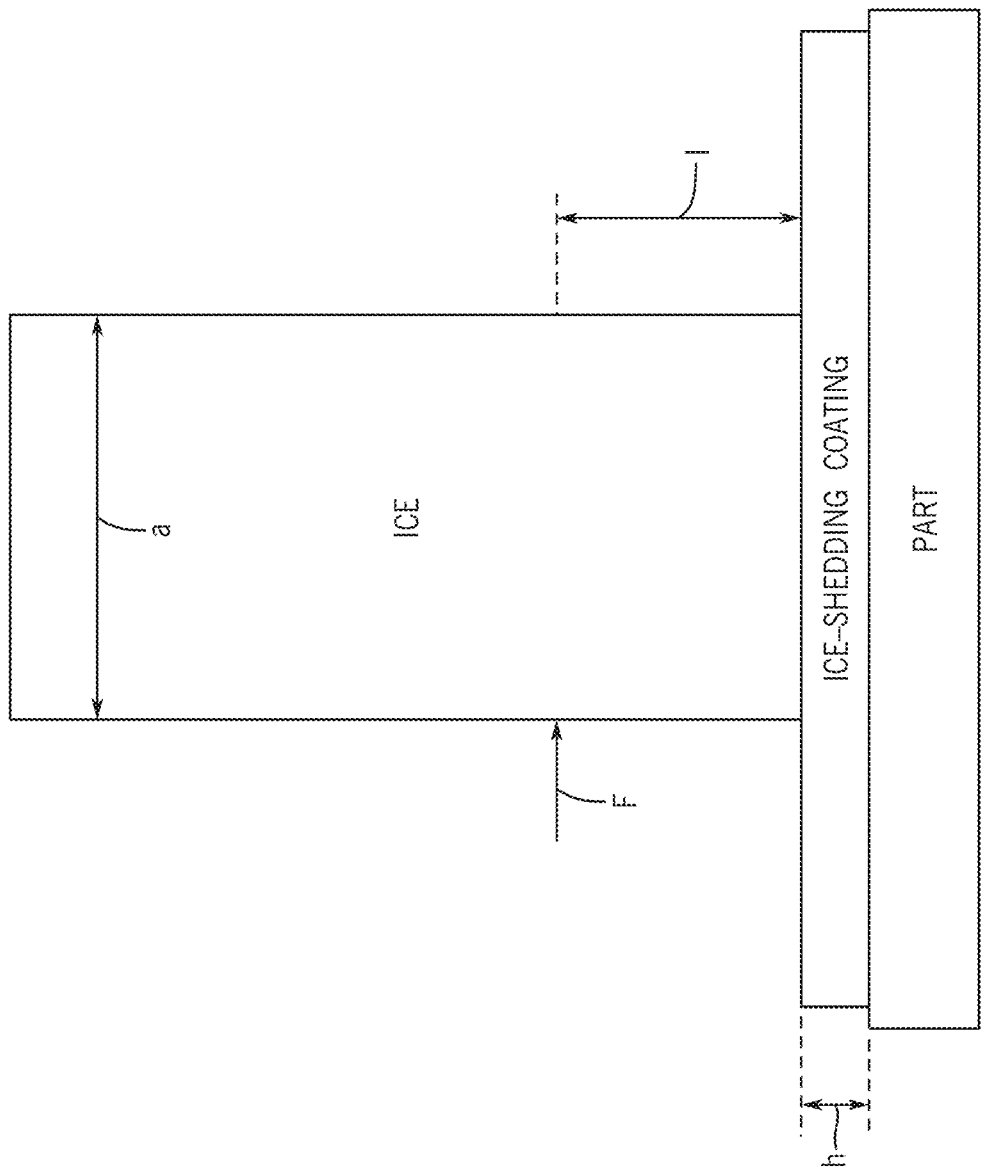

POLYURETHANE-BASED ICE-SHEDDING COATINGS

CROSS-REFERENCE TO RELATED APPLICATION

This application claims priority to and the benefit of U.S. Provisional Application No. 63/139,604 entitled "Polyurethane-Based Ice-Shedding Coatings," filed Jan. 20, 2021, which is hereby incorporated by reference in its entirety for all purposes.

FIELD OF DISCLOSURE

The present disclosure relates generally to ice-shedding coatings and, more specifically, to polyurethane-based, stress-localized ice-shedding coatings.

BACKGROUND

Icing is a common phenomenon in nature and technology, and it impacts a broad spectrum of industries ranging from transportation systems, power transmission lines, and infrastructures to energy systems. Icing on aircraft wings, control surfaces, sensors, and turbomachinery has detrimental effects on aerodynamics and engine performance and operability, while icing on ground surfaces, facilities, and equipment can hinder effective operations and present operational hazards. In marine applications, icing and ice accretion can cause damage to ship hulls, ship facilities, and instrumentation onboard while limiting the speed and maneuverability of the ships. Overall, the addressable market for anti-icing surfaces exceeds $1.5 billion annually. Icing creates a myriad of issues around human well-being on a daily basis in cold climates.

State-of-the-art ice-shedding coatings can be grouped into four categories; namely, superhydrophobic, liquid-infused, low-interfacial toughness, and stress-localized coatings. The first three categories include coatings/surface treatments that provide low-to-moderate ice adhesion, but they generally suffer from durability issues. Currently-available stress-localized coatings can provide low ice adhesion with moderate durability, but they remain incapable of functioning for extended time periods in extremely harsh environments. In particular, for aerospace applications (e.g., drones and rotor-crafts) and wind turbines, high durability is an important consideration.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, an ice-shedding coating solution for forming a polyurethane-based, stress-localized ice-shedding coating, wherein the ice-shedding coating solution includes: a Phase I solution having a polyurethane resin; a Phase II-A solution having a thermoplastic elastomer, a wax, and a high-oleic oil; and a Phase II-B solution having a silicone elastomer and a silicone oil.

In another embodiment, a method of manufacturing, includes preparing a Phase I solution having a polyurethane resin; preparing a Phase II-A solution having a thermoplastic elastomer, a wax, and a high-oleic oil; and preparing a Phase II-B solution having a silicone elastomer and a silicone oil. The method also includes combining the Phase I solution, the Phase II-A solution, and the Phase II-B solution to yield an ice-shedding coating solution.

In another embodiment, a polyurethane-based, stress-localized ice-shedding coating includes a high-shear modulus polyurethane matrix phase and a first low-shear modulus phase and a second low-shear modulus phase uniformly distributed within the high-shear modulus polyurethane matrix phase. Additionally, the first low-shear modulus phase is a first product of a thermoplastic elastomer, a wax, and a high-oleic oil, while the second low-shear modulus phase is a second product of a silicone elastomer and a silicone oil.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 1A is a schematic diagram illustrating ice detachment from a part having a stress-localized ice-shedding coating, in accordance with embodiments of the present technique;

FIG. 4A is a reproduction of a photograph of an airfoil without an ice-shedding coating during an ice adhesion test, while

DETAILED DESCRIPTION

Figure 1B:
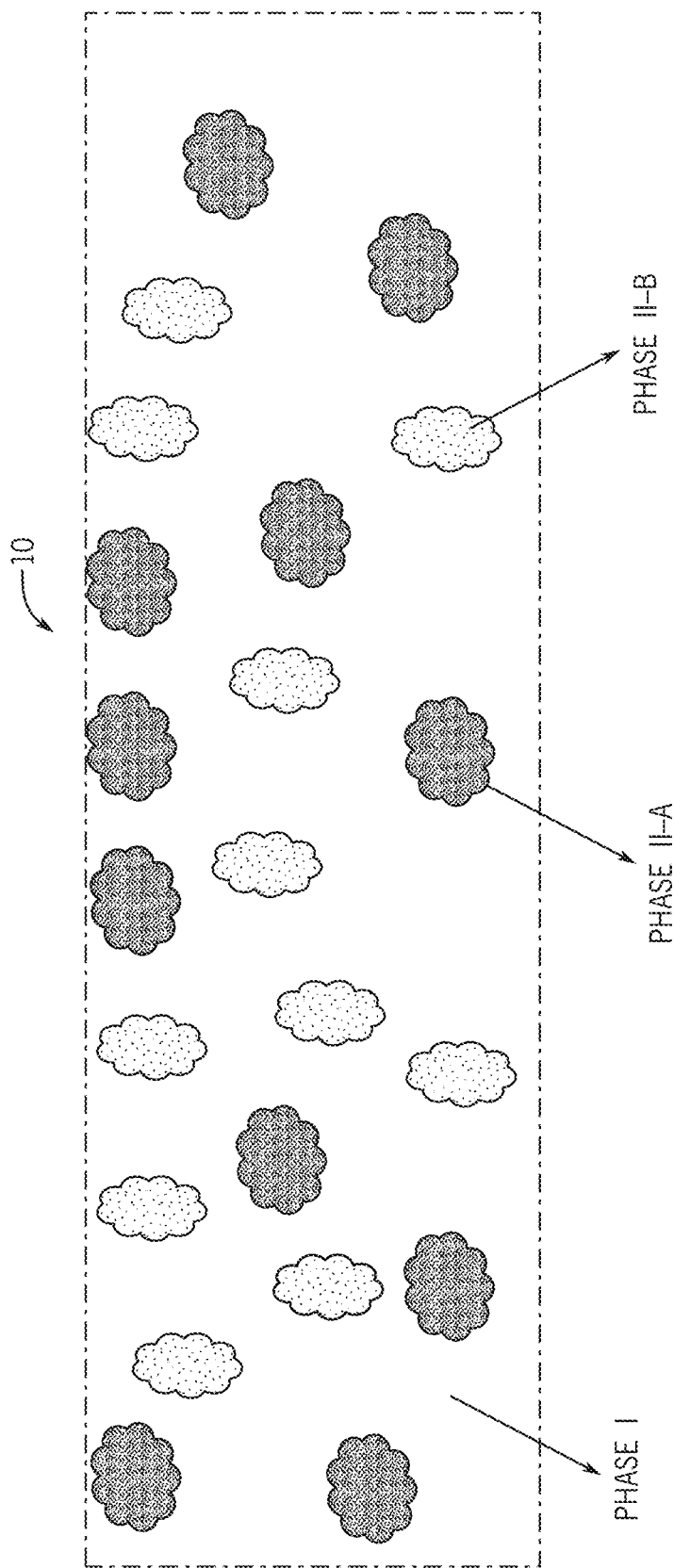
FIG. 1B is a schematic diagram illustrating a distribution of phases in an embodiment of a polyurethane-based, stress-localized ice-shedding coating, in accordance with embodiments of the present technique.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Further, to the extent that certain terms such as parallel, perpendicular, and so forth are used herein, it should be understood that these terms allow for certain deviations from a strict mathematical definition, for example to allow for deviations associated with manufacturing imperfections and associated tolerances.

The concept of stress localization, as mentioned above, provides a route to achieve novel ice-shedding coatings that demonstrate low ice adhesion and moderate durability. These coatings generally include two phases in which the matrix phase (Phase I) has high-shear modulus and helps impart durability to the overall coating, and the second dispersed phase (Phase II) with low-shear modulus leads to stress-localization and initial crack formation at the ice-material interface. The adhesion of ice to each phase depends on the respective shear modulus of each phase. Once an external force is applied to attach ice on a surface, Phase II will initially detach from ice and form local cracks at the ice-material interface. The crack induces an elastic stress field on the perimeter of the crack and localizes the stress. The localized stress leads to opening of the crack and propagation at the interface. That is, the induced stress field by the second phase is responsible for crack growth and detachment of ice from the material. The ice adhesion on these stress-localized surfaces is written as the following mathematical relationship:

$$\sigma_s \approx g(\varphi_{II})\left(\frac{a}{l}\right)\sqrt{\frac{W_a G_m}{h}}$$

where $g(\varphi_{II})$ denotes the stress-localization function, $\varphi_{II}$ is the volumetric fraction of Phase II, $W_a$ is the work of adhesion of the material, $G_m$ is the shear modulus of the material, while h, a, and l are geometric parameters illustrated in FIG. 1A. The value of $g(\varphi_{II})$ directly depends on the radius of curvature of the induced crack at the interface, and it is presently recognized that $g(\varphi_{II})$ can be tuned to lower values by tuning and controlling the morphology of Phase II.

In state-of-the-art silicone elastomer-based, stress-localized coatings, a silicone elastomer may be selected as the matrix (Phase I) and silicone-based organogels may be selected as the second phase (Phase II). As both phases are silicone-based materials, they demonstrate good compatibility, leading to a uniform and consistent coating formulation. However, despite showing low ice adhesion, it is presently recognized that these silicone elastomer-based ice-shedding coatings generally cannot withstand highly abrasive or erosive conditions that occur in some settings.

With the foregoing in mind, the embodiments presented herein provide a novel material paradigm to address the above challenges via polyurethane-based, stress-localized coatings ice-shedding coatings with exceptional durability. The disclosed ice-shedding coatings can withstand particularly harsh conditions, such as those seen in rain erosion tests that are commonly conducted to assess coatings for aerospace applications. For the disclosed stress-localized coatings, it is presently recognized that the proper choice of the phases plays an important role in the uniformity, performance, and durability of these coatings. As illustrated in FIG. 1B, embodiments of the disclosed ice-shedding coating 10 include: a polyurethane-based, high-shear modulus matrix (i.e., Phase I, matrix phase), and two chemically-distinct, low-shear modulus phases (i.e., Phase II-A and Phase II-B) uniformly distributed throughout the matrix phase. As such, the ice-shedding coating 10 includes particles (e.g., domains, regions) of Phase II-A and particles (e.g., domains, regions) of Phase II-B uniformly dispersed within the matrix phase, wherein the Phase II particles or domains range from approximately 100 nanometers (nm) to approximately 10 micrometers (μm) (e.g., between 1 μm and 20 μm, between 1 μm and 10 μm).

As discussed below, the chemistry and morphology of Phase II-A and Phase II-B are suitably selected and controlled to achieve uniform coatings with high-durability for ice-shedding purposes. For example, as discussed below, the disclosed ice-shedding coatings can provide high-durability under rain erosion conditions with wind speeds exceeding 172 meters/second.

Experimental Example of a Polyurethane-Based Stress-Localized Coating: EC-15

The synthesis and testing of an example embodiment of a polyurethane-based, stress-localized ice-shedding coating is disclosed, referred to herein as EC-15. It should be appreciated that this embodiment is provided as merely an example of the present approach, and in other embodiments, the techniques discussed herein may be applied to produce other polyurethane-based, stress-localized ice-shedding coatings, in accordance with the present disclosure.

For the example EC-15 embodiment, an example polyurethane resin was acquired as an aliphatic polyurethane resin matrix from Covestro AG, headquartered in Leverkusen, Germany. An example thermoplastic elastomer was acquired as a styrene-ethylene/butylene-styrene (SEBS) polymer from the Kraton Corporation, located in Houston, Texas. An example liquid paraffin wax (LPW) (e.g., between 200 grams per mole (g/mol) and 400 g/mol) and an example silicone oil (e.g., a polydimethylsiloxane oil) were acquired from Sigma Aldrich (http://sigmaldrich.com), headquartered in St. Louis, Missouri. An example high-oleic oil was acquired as safflower oil from Oleico. An example silicone elastomer (e.g., a solid or cross-linked polydimethylsiloxane) was acquired as Sylgard 184 from Dow Chemical Company, headquartered in Midland, Michigan. For this example embodiment, naphtha was used as a volatile organic solvent. It may be appreciated that, in other embodiments, other materials from other vendors may be used, in accordance with the present disclosure.

Figure 2A:
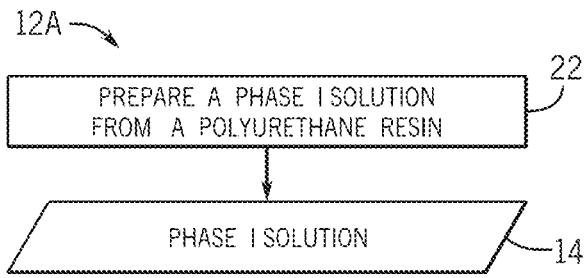
FIGS. 2A, 2B, 2C, and 2D are flow diagrams illustrating an example of a manufacturing process for embodiments of the ice-shedding coating, in accordance with embodiments of the present technique.
Figure 2B:
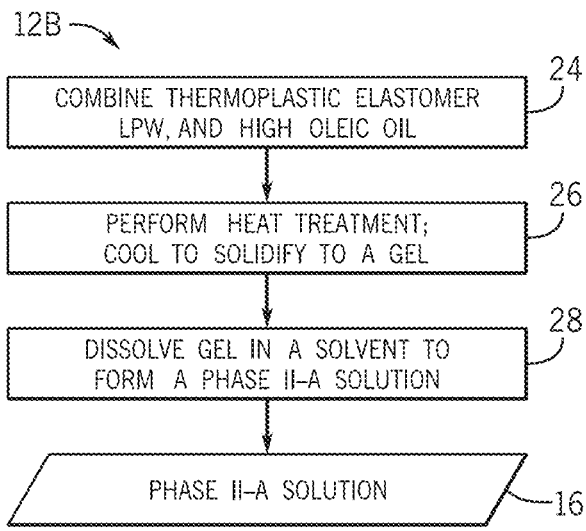
Figure 2C:
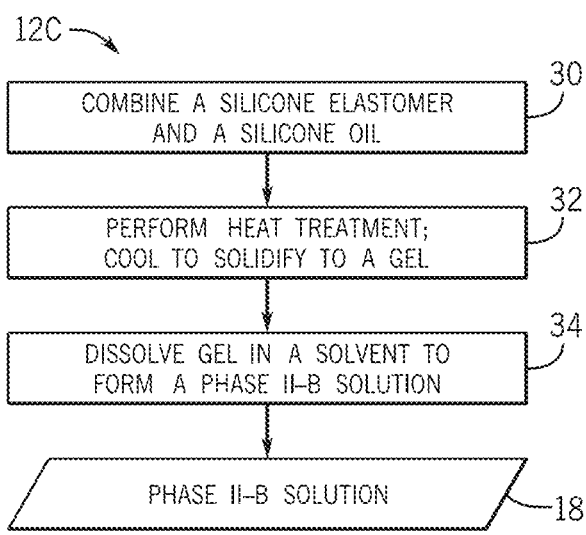

FIGS. 2A-D are flow diagrams illustrating portions of an example process 12 for manufacturing embodiments of the disclosed ice-shedding coating 10. The illustrated embodiment of the process 12 includes: process 12A, in which a Phase I solution 14 is prepared, as illustrated in FIG. 2A; process 12B, in which a Phase II-A solution 16 is prepared, as illustrated by FIG. 2B; process 12C, in which a Phase II-B solution 18 is prepared, as illustrated by FIG. 2C; and process 12D in which the Phase I solution 14, the Phase II-A solution 16, and the Phase II-B solution 18 are combined to form an ice-shedding coating solution 20 that is subsequently applied to the surface of a part to form the disclosed ice-shedding coating 10. In certain embodiments, processes 12A, 12B, and 12C may be performed in parallel for enhanced efficiency. As illustrated in FIG. 2A, process 12A includes preparing the Phase I solution 14 from the polyurethane resin (block 22). For example, in certain embodiments, the Phase I solution 14 is prepared by mixing a suitable solvent with the polyurethane resin in a weight ratio of 1 part solvent to between 3 and 5 parts polyurethane resin.

As illustrated in FIG. 2B, process 12B includes combining (block 24) the thermoplastic elastomer, the LPW, and the high-oleic oil to form a first mixture. For example, in certain embodiments, the first mixture is prepared by mixing the components in a weight ratio of 1 part thermoplastic elastomer to between 5 and 10 parts LWP to between 5 and 10 parts high-oleic oil. For the illustrated embodiments, the first mixture is subsequently heat treated (e.g., annealed at a temperature between 70° C. and 90° C. for 4 to 6 hours), and then allowed to cool and solidify (block 26). Subsequently, the solid is dissolved in a suitable solvent (block 28) to generate the Phase II-A solution 16.

As illustrated in FIG. 2C, process 12C includes combining (block 30) the silicone elastomer with the silicone oil to form a second mixture. For example, in certain embodiments, the second mixture is prepared by mixing the components in a weight ratio of 1 part silicone elastomer to between 5 and 10 parts silicone oil. For the illustrated embodiment, the second mixture is subsequently heat treated (e.g., annealed at a temperature between 70° C. and 90° C. for 4 to 6 hours) and allowed to cool and solidify (block 32). Subsequently, the solid is dissolved in a suitable solvent (block 34) to generate the Phase II-B solution 18.

Figure 2D:
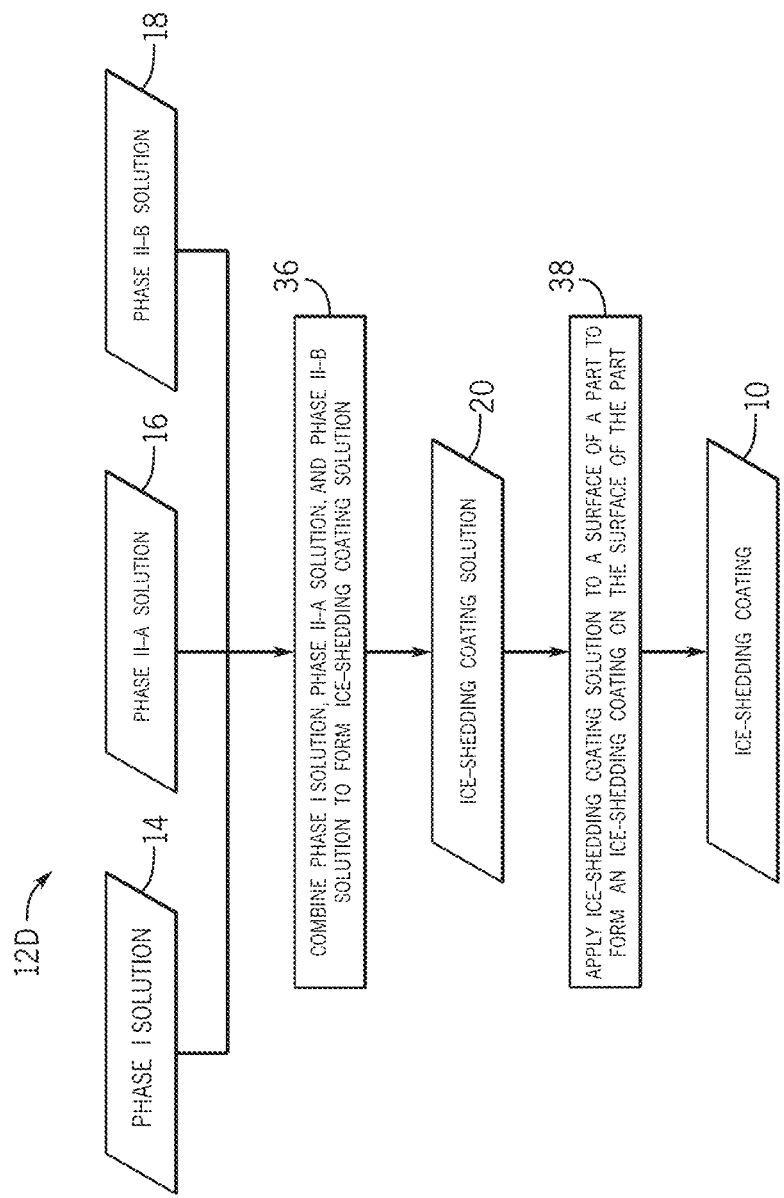

As illustrated in FIG. 2D, process 12D includes combining (block 36) the Phase I solution 14, the Phase II-A solution 16, and the Phase II-B solution 18 to form the ice-shedding coating solution 20. In certain embodiments, additional volatile organic solvent may be included in the ice-shedding coating solution 20. For example, in certain embodiments, the ice-shedding coating solution 20 includes, by weight: between 30% and 82.5% of the Phase I solution 14, between 0.25% and 10% of the Phase II-A solution 16, between 0.25% and 20% of the Phase II-B solution 18, and between 17% and 40% solvent. After being prepared, the ice-shedding coating solution 20 is subsequently applied (block 38) to a surface of a part to form the ice-shedding coating 10 on a surface of the part. As noted below, in certain embodiments, the surface of the part may be prepared in a number of ways prior to application of the ice-shedding coating solution 20, including surface treatment to remove impurities and/or application of a polyurethane-compatible primer. After application of the ice-shedding coating solution 20 onto the surface of the part (e.g., spray coating), the ice-shedding coating solution 20 cures to form the ice-shedding coating 10 on the part. In certain embodiments, curing may involve allowing solvent to evaporate (e.g., to dry) from the applied ice-shedding coating solution 20, while in other embodiments, the curing may be accelerated or enhanced by applying energy (e.g., heat, light) to the applied ice-shedding coating solution 20 to form the ice-shedding coating 10.

Samples of the example ice-shedding coating EC-15 were examined in two main ways: (1) ice adhesion and ice-shedding characteristics and (2) mechanical, chemical, and environmental durability. To assess performance of the disclosed ice-shedding coating versus other available technologies, four other coating types were examined alongside the example ice-shedding coating (i.e., EC-15). The other coating types are Slippery surfaces (SLIPS), liquid-infused surfaces (LIS), low-interfacial toughness (LIT), and silicon-based stress-localized surfaces (DI-25). All the surfaces were developed with a thickness of approximately 150 µm, except the LIT samples in which low thickness is required for their ice-shedding characteristics. For the LIT surface, thickness of 1 µm was selected. It may be appreciated that these coatings operate based on different physical principles. For example, SLIPS functions based on a capillary-secured liquid film on the surface, LIT surfaces function based on low cross-linking density and slip boundary conditions, while DI-25 and EC-15 both function based on stress localization.

Figure 3A:
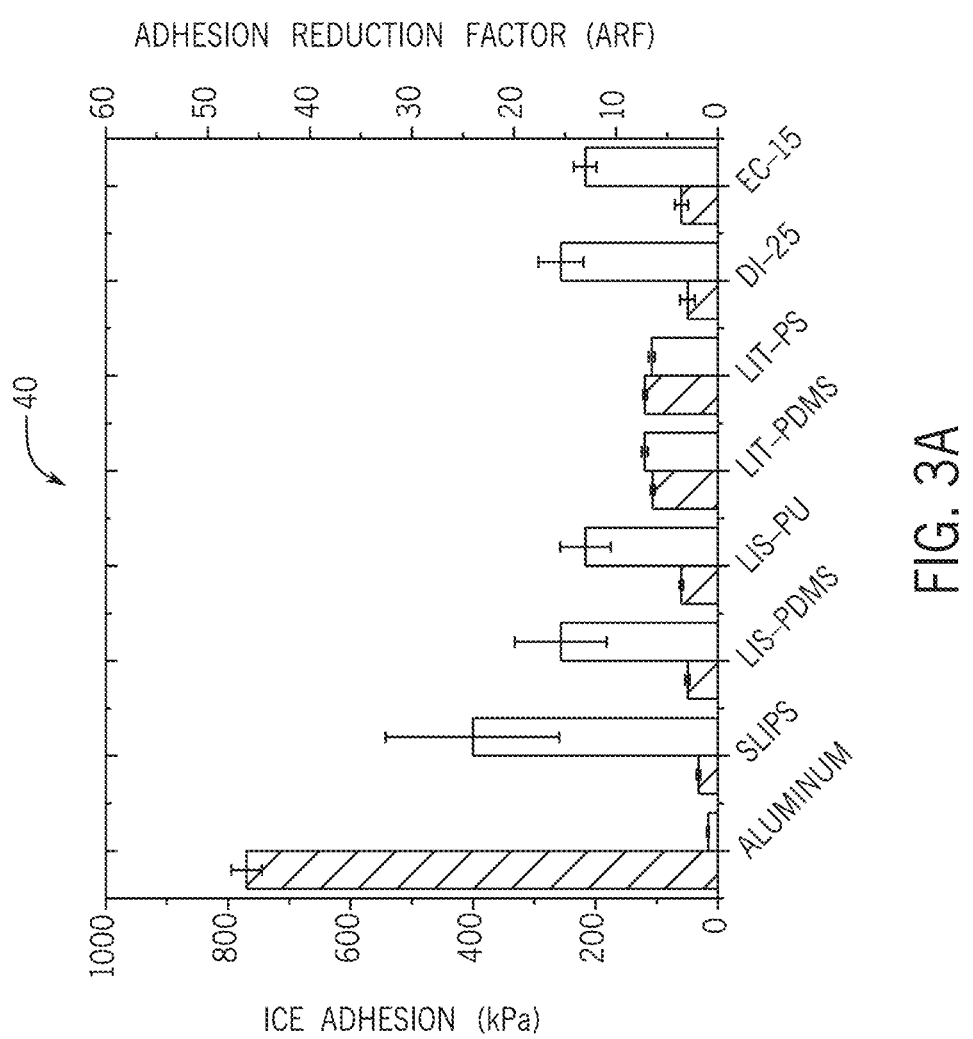
FIG. 3A is a graph illustrating ice adhesion and adhesion reduction factors for various substrates and various ice-shedding coatings, in accordance with embodiments of the present technique.

The ice adhesion measurements were conducted according to the procedure discussed in Irajizad et al. (Irajizad, P., Nazifi, S. & Ghasemi, H. Icephobic surfaces: Definition and figures of merit. Adv. Colloid Interface Sci. 269, 203-218 (2019)). The ice-shedding substrates were placed on a cold plate at a temperature of −15° C. The force applied to remove ice from the substrate divided by the cross-section of ice-material is reported as the ice adhesion (the cross-hatched bar on the left for each sample) in the graph 40 of FIG. 3A. As illustrated, ice adhesion on a reference aluminum substrate, along with state-of-the-art icephobic surfaces, were measured. The reported values represent an average of ten measurements on each material. The measurements suggest that SLIPS, LIT samples, DI-25, and EC-15 all demonstrated low ice adhesion.

To minimize the role of geometry and environmental conditions on ice adhesion, ice adhesion reduction factor (ARF) was used as another metric, as defined based on the following equation:

$$ARF = \frac{\sigma_s(Al)}{\sigma_s(\text{Ice shedding surface})}$$

This criterion is a non-dimensional figure independent of the measurement setup. The ARF values for various surfaces are indicated by the non-cross-hatched bar on the right for each sample in graph 40 of FIG. 3A. As shown, the SLIPS, LIS, DI-25 and EC-15 coatings are capable of reducing ice adhesion on an aluminum surface by 15-25 times. As such, ice adhesion on EC-15 is in the same range of some of the state-of-the-art coatings (e.g., approximately a 13× reduction in ice adhesion), while also demonstrating superior durability relative to the other coatings, as shown below.

Figure 3B:
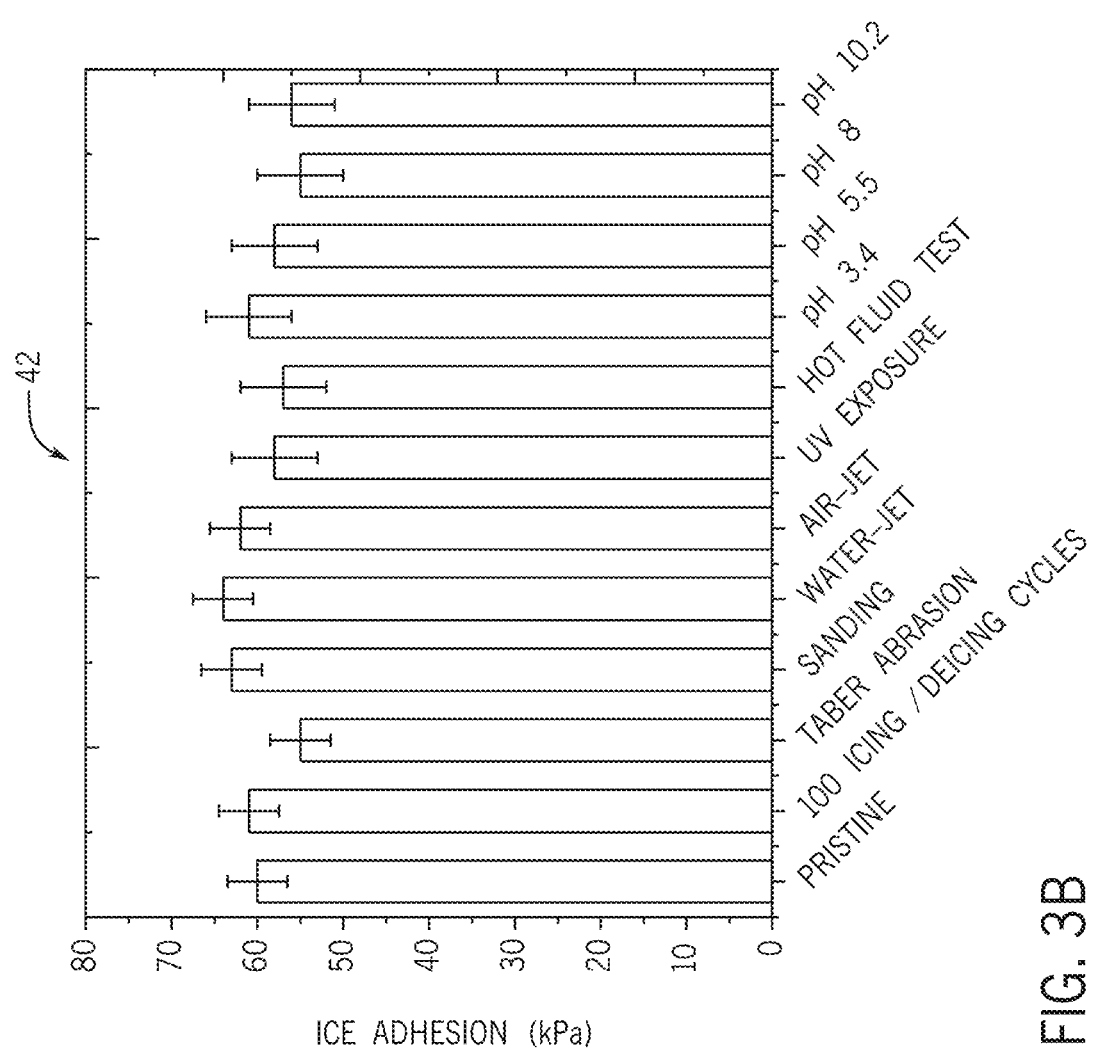
FIG. 3B is a graph illustrating ice adhesion for an embodiment of the ice-shedding coating after exposure to various harsh conditions, in accordance with embodiments of the present technique.

Although ice adhesion on new, pristine surfaces offers one initial metric used to assess performance of ice-shedding coatings, it is presently recognized that a more important factor is ice adhesion of these surfaces after having been exposed to various mechanical, chemical, and environmental stresses that inevitably damage, and potentially reduce the effectiveness, of the coatings. For instance, it has been shown that SLIPS surfaces lose their characteristics (i.e. depletion of liquid) after a number of icing and de-icing cycles. As indicated by the graph 42 of FIG. 3B, the EC-15 coated surfaces were exposed to a wide range of harsh environmental conditions to assess ice adhesion on these surfaces after these exposures, including: 100 icing/deicing cycles, abrasion, water and air jets, long-term UV exposure, high temperatures, and chemically-corrosive environments. As shown, ice adhesion on these EC-15 coated surfaces remains quite stable, even after exposure to multiple forms of abrasion, erosion, and exposure to different chemicals.

Figure 4A:
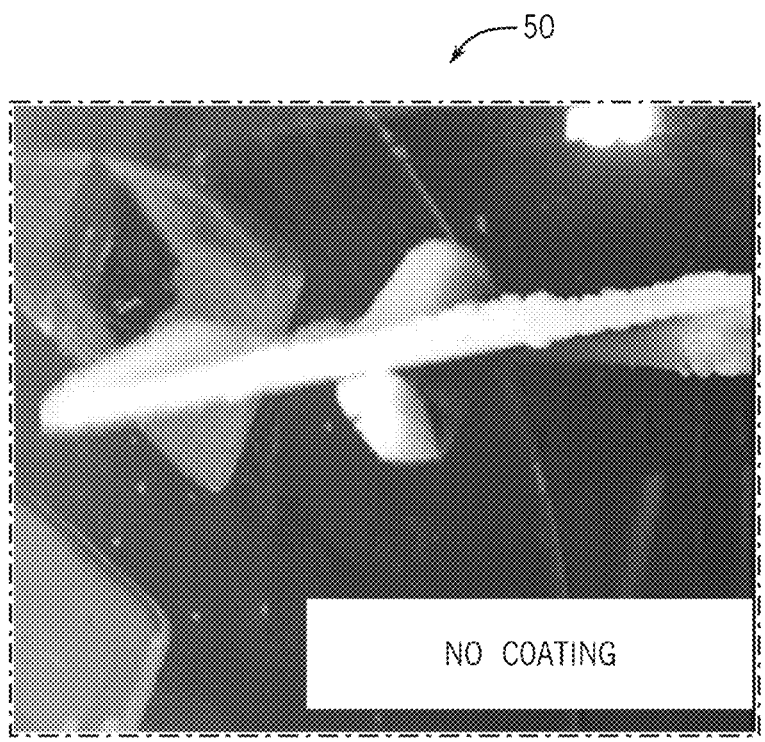
Figure 4B:
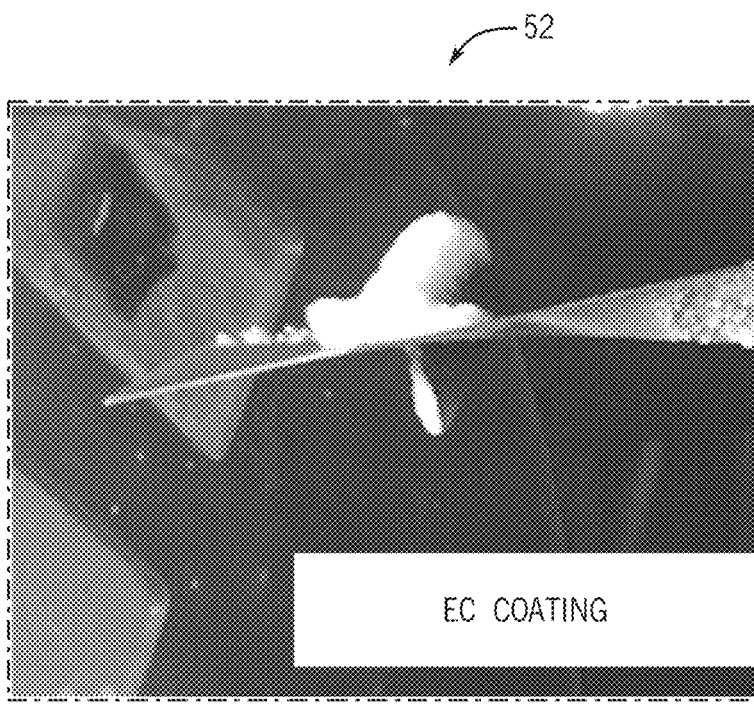
FIG. 4B is a reproduction of a photograph of the airfoil with the ice-shedding coating during the ice adhesion test, in accordance with embodiments of the present technique.

The ice-shedding performance of these coatings was also assessed in an icing wind tunnel on an aircraft airfoil at temperature of −15° C. and compared to an airfoil with no coating. The results are shown in FIG. 4, with FIG. 4A including a representation of a photograph 50 of the airfoil with no coating, and 4B including a representation of a photograph 52 of the airfoil with the EC-15 coating at the conclusion of the test. As shown, the EC-15 coated airfoil experiences a substantially reduced the amount of ice buildup through the duration of the test.

As discussed below, a comprehensive set of tests was conducted to assess the mechanical durability of the example polyurethane-based, stress-localized ice-shedding coating (i.e., the EC-15 coated samples), including abrasion, pencil hardness, shore hardness, cross-hatch, and rain erosion.

Figure 5A:
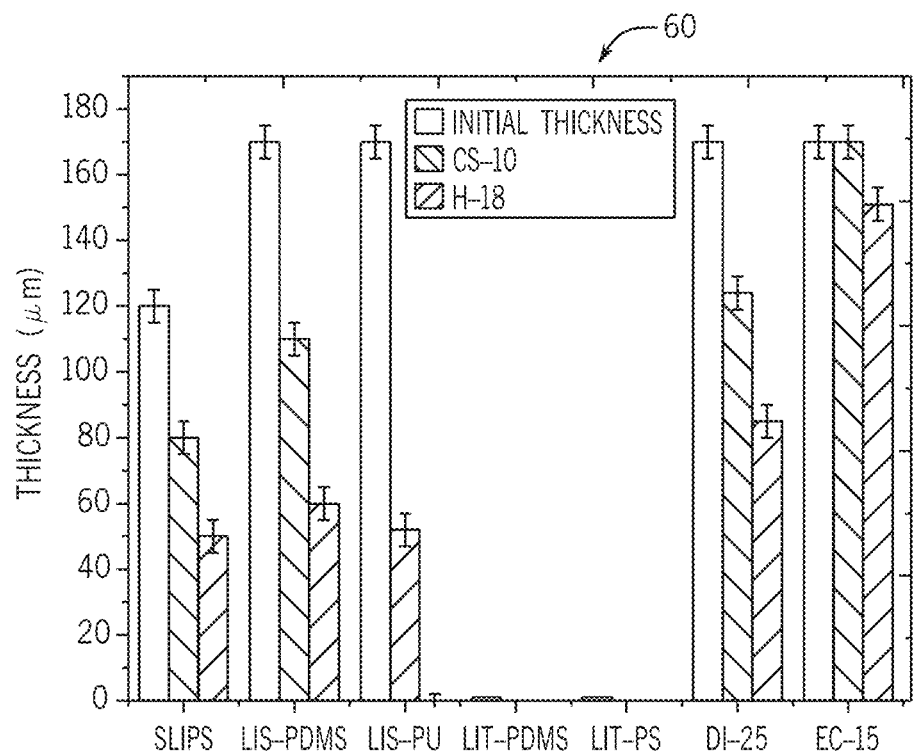
FIG. 5A is a graph of ice-shedding coating thickness loss from abrasion testing for various ice-shedding coatings, in accordance with embodiments of the present technique.
Figure 5B:
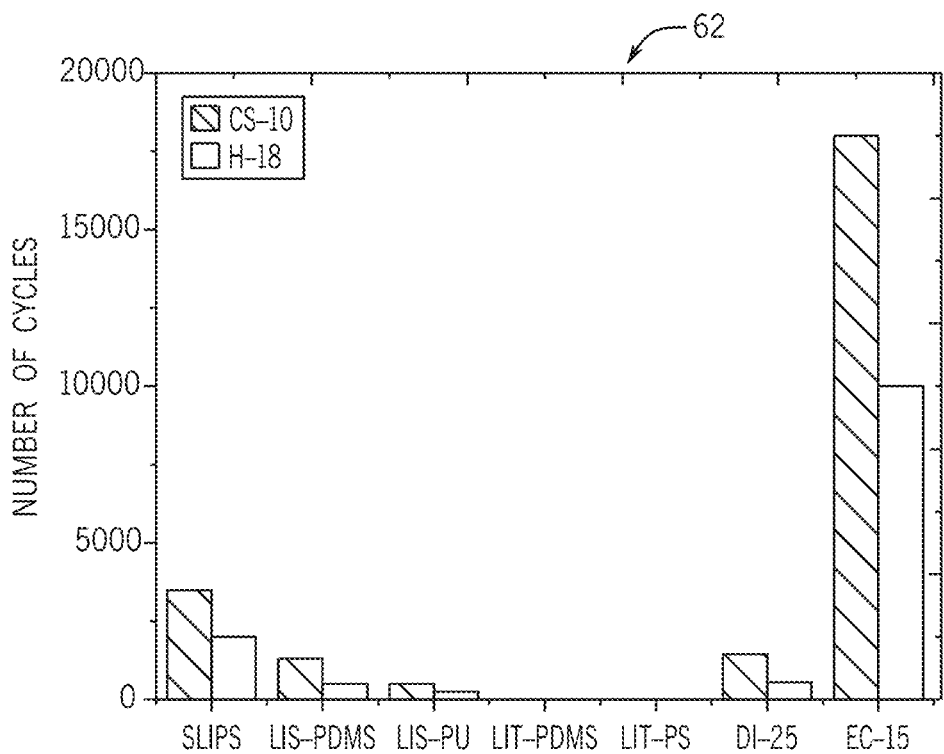
FIG. 5B is a graph of abrasion cycles needed to cause various coatings to lose half their respective thicknesses, in accordance with embodiments of the present technique.

Taber Abrasion: In this metrology, a Taber abrasion test (Taber Reciprocating Abraser, Model 5900) was conducted according to ASTM D4060. In these experiments, removal of the ice-shedding coating under a load of 5 Newtons (N) with a soft tip of CS-10 and a hard tip of H-18 was assessed. Ice-shedding samples were placed firmly on a horizontal plate in the Taber instrument and 1000 abrasion cycles were conducted. The thickness losses for various samples are shown in the graph 60 of FIG. 5A. Note that for LIT samples, the low thickness is essential for their ice-shedding performance. These surfaces are completely abraded after a few cycles with a soft-tip and the tip touches the underlying glass substrate. To put the abrasion resistance in a better perspective, the number of the cycles to remove half of the thickness of the ice-shedding coating using both CS-10 and H-18 tips were measured, as shown in the graph 62 of FIG. 5B. As shown, although LIS-CB provides low ice adhesion, it could not last more than 400 cycles with the tip CS-10 and 100 cycles with the tip H-18. The scenario is somewhat better for DI-25 samples, but still not satisfactory. For the EC-15 samples, however, the mechanical durability is far superior to the other surfaces, and it takes 100,000 abrasion cycles with the hard tip of H-18 to abrade half of the thickness of the coating.

Figure 5C:
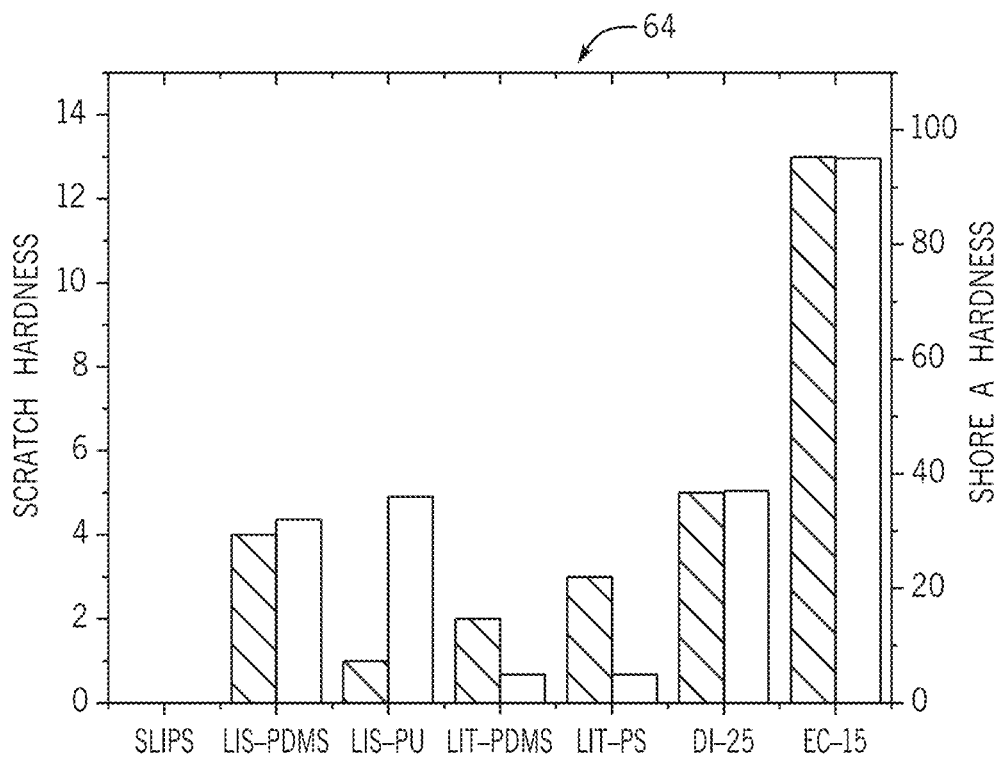
FIG. 5C is a graph indicating hardness of ice-shedding surfaces having various coatings applied thereto, in accordance with embodiments of the present technique.

Pencil Hardness: This metrology was conducted based on the ASTM D3363 standard. The hardness of the ice-shedding material is determined by pencil leads of known hardness ranging from 6 B to 6 H. The scratch resistance of the surfaces is indicated by the cross-hatched bar on the left for each sample in the graph 64 of FIG. 5C. The EC-15 samples demonstrated a pencil hardness of 6 H.

Shore Hardness: The shore hardness test was conducted by Rex Durometer, DD4A according to ASTM D2240. A glass substrate was coated with the ice-shedding coatings to a thickness of 300 μm thickness is required for the hardness measurements (note: as LIT surfaces must necessarily be thinner than this, these materials were not assessed for this test). The Durometer was placed gently on the surface until the tip of the durometer completely penetrates the coating and reaches the underlying substrate. Then, the shore hardness was read. This procedure was conducted three times, and the average value is indicated by the non-cross-hatched bar on the right for each sample in the graph 64 of FIG. 5C. As shown, EC-15 samples demonstrated a shore hardness of approximately 95, in contrast to other surfaces that have lower shore hardness values. This provides a clear advantage for EC-15 in its ability to avoid scratches.

Figure 6A:
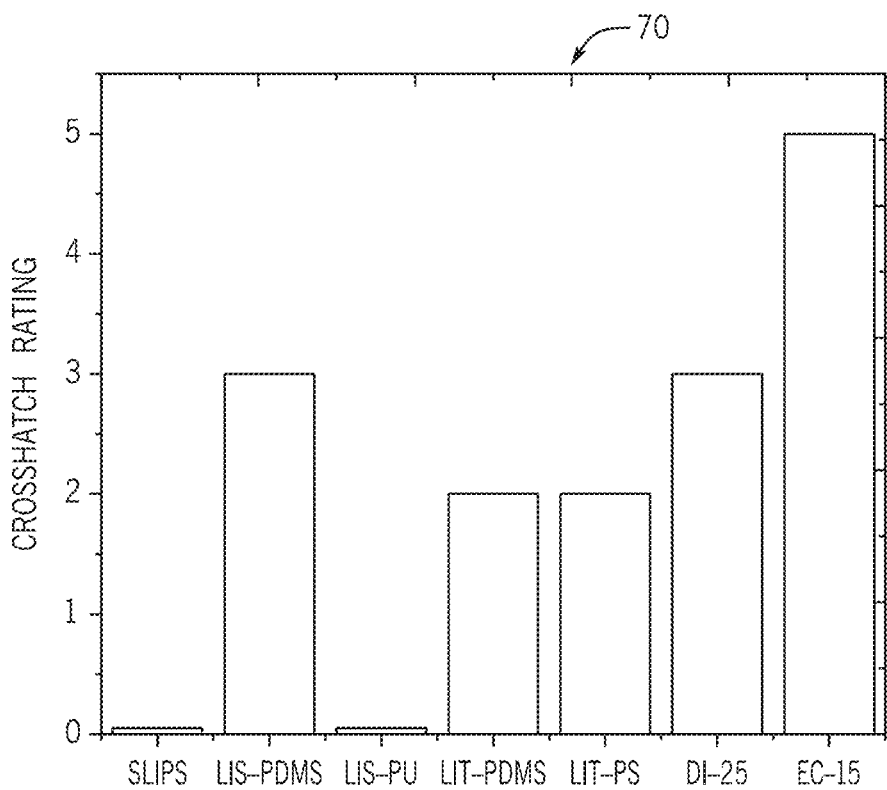
FIG. 6A is a graph indicating scratch resistance of ice-shedding surfaces having various coatings applied thereto, in accordance with embodiments of the present technique.

Cross Hatch: This metrology was conducted based on the ASTM D3359 standard. The tested samples are classified based on the metric bar of 0 B-5 B as the 0 B is the least durable sample and 5 B represents the highest durability, as indicated by the graph 70 of FIG. 6A. The EC-15 samples demonstrated approximately 0% area removed and was classified at scale 5 B. This suggests the strong cohesive bonding characteristics of these surfaces.

Pull-off Adhesion: This metrology measures adhesion of the ice-shedding material to the substrate and was conducted according to ASTM D4541. The failure in this experiment could be either adhesive or cohesive. The cohesive failure indicates low durability of the material. For EC-15 samples, the type of failure was adhesive with pull-off force of 1.7 megapascal (MPa). As primers could be used to strengthen adhesion of various coatings to a substrate, a comparative study for this metrology is not provided.

Figure 6B:
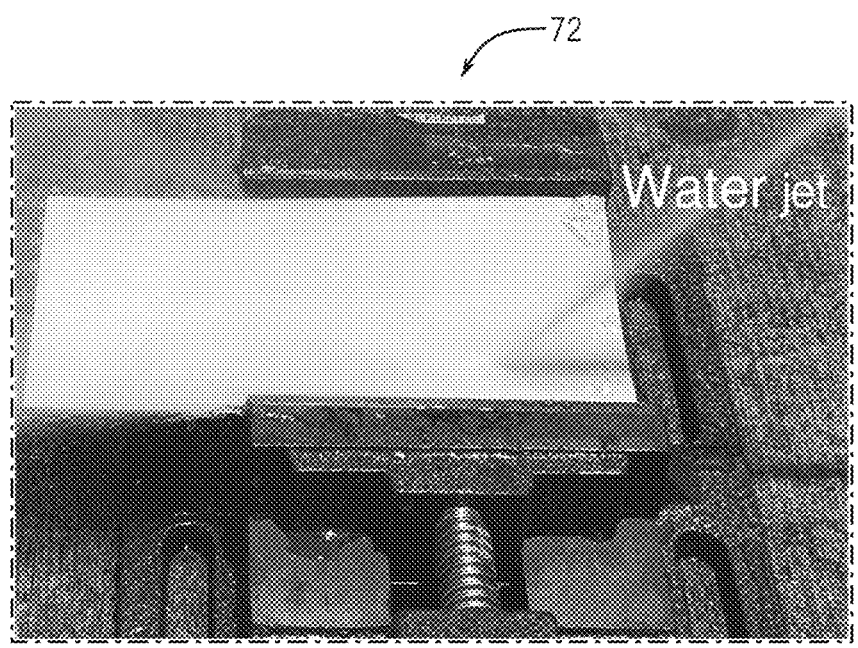
FIG. 6B illustrates a surface having an embodiment of the ice-shedding coating applied thereto under a water jet test, in accordance with embodiments of the present technique.

Water jet: In this metrology, which is a less severe form of rain erosion, the EC-15 surface was placed under a water jet as shown in the reproduced photograph 72 of FIG. 6B. The water jet ran for 30 minutes on the coating and the samples were visually examined before and after the test. No visual change was detected on the EC-15 samples. This pre-qualifies the surface for the rain erosion metrology.

Rain Erosion: Aerospace rain erosion tests are one of the harshest tests that can be conducted on a coating. Although surfaces such as DI-25 provide good durability and low ice adhesion, they generally fail rain erosion tests. Thus, the most durable surface (i.e. the EC-15 sample) was chosen for the rain erosion test. This test was conducted in a whirling arm rain erosion test facility by an independent aerospace third party. For this test, the edge of the airfoil is taped, and the rest of the airfoil is coated with the polyurethane-based ice-shedding coating. The tape is then removed before the test, such that there is now a sharp line where the coating stops. Here, accelerating water droplets will impact the coating and attempt to delaminate the coating from the underlying substrate. The water droplets are 1 millimeter (mm) to 4 mm in size simulated through five water nozzles. The water flow rate is 0.25 cubic meters per hour ($m^3$/hour) to achieve 7 centimeters (cm) to 10 cm of rain fall per hour. The impact speed of the rain droplets is 172 meters per second and the tests are conducted at ambient temperature. The tests were conducted on three airfoils. Upon analysis, the rain-eroded EC-15 samples were intact with no significant signs of damage or adhesive/cohesive failure (e.g., delamination).

As discussed below, a set of chemical durability tests was conducted to assess the chemical durability of the new ice-shedding coatings. These tests were conducted in two ways: (1) evaluation of the coating exposed to fluids with various pH at ambient temperature, and (2) evaluation of the coating exposed to jet hydraulic fluids and lubricating oils at elevated temperatures.

Chemical durability (Approach 1): In these tests, fluids with a range of pH between 3 and 10 were used. The acidic (low pH) solutions were prepared using hydrochloric acid (HCl) and deionized water. The basic (high pH) solutions were prepared using sodium hydroxide (NaOH) and deionized water. The coated samples were soaked in these solutions for 24 hours and, after this time, the integrity of the coatings was examined, looking for any signs of softening, blistering or other possible surface damage or changes in the integrity of the coating. Furthermore, the ice adhesion of these samples was measured as shown previously in FIG. 3B.

Chemical durability (Approach 2): In these tests, which are specifically designed for aerospace applications, the durability of the coating is examined with respect to hydraulic fluid and lubricating oil. The substrate material consisted of Aluminum 2024 (T3 temper) with dimensions of 152.4 mm×76.2 mm×0.5 mm. The samples were coated with a primer with a thickness of 25 µm and then the polyurethane-based ice-shedding coating with a thickness of 50 µm. Initially, the samples were immersed in the jet hydraulic fluid at 66° C. for 24 hours. The coupons were tested before and after the immersion. Only a slight amount of staining was observed after the test. No visible softening or blistering was detected. In the next set of experiments, the panels were immersed in a lubricating oil at 121° C. for 24 hours. No visible softening or blistering was observed after the test.

As discussed below, a set of environmental durability tests was conducted to assess the environmental durability of the new ice-shedding coatings, including weather resistance tests, impact flexibility tests, and low temperature flexibility tests.

Weather resistance: The durability of ice-shedding coatings was examined through the ASTM G155 standard. In accordance with this standard, the samples were exposed to Xenon-arc lamp and cycled between 102 minutes of light-only exposure, followed by 18 minutes of a combination of light exposure and water spray, for a total of 3000 hours. After removal from a weatherometer, the 60° specular gloss of the coating was tested according to ASTM D523. The gloss change was less than 20 relative to the unexposed initial sample.

Impact flexibility: This test was conducted according to ASTM standard D6905 by an independent aerospace third party. The test panels for this analysis were anodized Aluminum 2024 (0 temper). The coatings (i.e., either EC-15 or a control coating) were applied on these panels without any primer and left to air dry for 14 days. The test was conducted at ambient temperature with a Gardco GE Universal Impact Tester. The coated test panels were placed downward on a rubber pad (shore hardness of 60 A) at the bottom of an impactor guide. The impactor was dropped on the coated sample. The impact area was examined by a microscope with 10× magnification. For the EC-15 sample, no cracks on the surface were observed up to 60% elongation, while the control coating demonstrated some cracking or tearing at 60% elongation. It may be noted that this exceeds a minimum threshold for the impact flexibility test, which targets having no observable cracking at up to 40% elongation.

Low temperature flexibility: This test was conducted according to ASTM standard D522. The test panels are similar to the impact flexibility test. Two test panels are examined at temperature of about −51° C. (±3° C.), one having the EC-15 coating, and the other having a control coating. The test was conducted based on method B, using cylindrical mandrel test with a 25.4 mm mandrel. The sample was placed on the mandrel with an uncoated side in contact with the mandrel and an overhang of greater than 50 mm on each side. Through steady pressure of the fingers, the panel was bent 180° around the mandrel. The panel was removed and examined with the unaided eye for possible crack formation. No crack on any sample was observed for either the EC-15 or the control coating.

In summary, the embodiments described herein introduce a new material paradigm for durable ice-shedding materials that provide low ice adhesion while having extreme durability under various mechanical, chemical, and environmental conditions. In this paradigm, a stress-localized surface is formed through a selective combination of polyurethane and two gel structures. The proper form of Phase I, Phase II-A, and Phase II-B materials leads to uniformity and high durability of these coatings. The Phase I material with high shear modulus is largely responsible for the high durability of the material, while the Phase II-A and Phase II-B materials with low shear modulus are responsible for stress localization in the material. The extreme mechanical durability of these surfaces is examined under rain erosion with no sign of defects at 172 meters per second wind/rain droplet speeds. It is believed that this novel material paradigm opens a new route for the development of durable ice-shedding coatings for a wide range of applications, especially for aviation, transportation, and wind power.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

The invention claimed is:

1. An ice-shedding coating solution for forming a polyurethane-based, stress-localized ice-shedding coating, wherein the ice-shedding coating solution comprises:
   a Phase I solution having a polyurethane resin;
   a Phase II-A solution having a thermoplastic elastomer, a wax, and a high-oleic oil; and
   a Phase II-B solution having a silicone elastomer and a silicone oil.

2. The ice-shedding coating solution of claim 1, wherein the ice-shedding coating solution includes, by weight, between 30% and 82.5% of the Phase I solution, between 0.25% and 10% of the Phase II-A solution, between 0.25% and 20% of the Phase II-A solution 18, and between 17% and 40% of a volatile organic solvent.

3. The ice-shedding coating solution of claim 1, wherein the Phase II-A solution comprises a weight ratio of 1 part the thermoplastic elastomer, to between 5 and 10 parts of the wax, to between 5 and 10 parts of the high-oleic oil.

4. The ice-shedding coating solution of claim 1, wherein the Phase II-B solution comprises a weight ratio of 1 part of the silicone elastomer to between 5 and 10 parts of the silicone oil.

5. The ice-shedding coating solution of claim 1, wherein the thermoplastic elastomer comprises a styrene-ethylene/butylene-styrene (SEBS) polymer.

6. The ice-shedding coating solution of claim 1, wherein the wax comprises a liquid paraffin wax (LPW) having a molecular weight of between 200 grams per mole (g/mol) and 400 g/mol.

7. The ice-shedding coating solution of claim 1, wherein the high-oleic oil comprises safflower oil.

8. The ice-shedding coating solution of claim 1, wherein the silicone elastomer comprises a solid polydimethylsiloxane and the silicone oil comprises a liquid polydimethylsiloxane.

9. A method of manufacturing, comprising:
   preparing a Phase I solution having a polyurethane resin;
   preparing a Phase II-A solution having a thermoplastic elastomer, a wax, and a high-oleic oil;

preparing a Phase II-B solution having a silicone elastomer and a silicone oil; and combining the Phase I solution, the Phase II-A solution, and the Phase II-B solution to yield an ice-shedding coating solution.

10. The method of manufacturing of claim 9, wherein the Phase I solution comprises a weight ratio of 1 part of a volatile organic solvent to between 3 and 5 parts of the polyurethane resin.

11. The method of manufacturing of claim 9, wherein preparing the Phase II-A solution comprises:

preparing a first mixture having a weight ratio of 1 part thermoplastic elastomer, to between 5 and 10 parts wax, to between 5 and 10 parts high-oleic oil;

annealing and cooling the first mixture to form a first solid; and dissolving the first solid in a volatile organic solvent to form the Phase II-A solution.

12. The method of manufacturing of claim 11, wherein preparing the Phase II-B solution comprises:

preparing a second mixture having a weight ratio of 1 part silicone elastomer to between 5 and 10 parts silicone oil;

annealing and cooling the first mixture to form a second solid; and dissolving the second solid in the volatile organic solvent to form the Phase II-A solution.

13. The method of manufacturing of claim 9, wherein the ice-shedding coating solution includes, by weight, between 30% and 82.5% of the Phase I solution, between 0.25% and 10% of the Phase II-A solution, between 0.25% and 20% of the Phase II-A solution, and between 17% and 40% of a volatile organic solvent.

14. The method of manufacturing of claim 9, comprising:

applying the ice-shedding coating solution to a surface of a part and curing the ice-shedding coating solution to form a polyurethane-based, stress-localized ice-shedding coating on the surface of the part.

15. A polyurethane-based, stress-localized ice-shedding coating, comprising:

a high-shear modulus polyurethane matrix phase; and a first low-shear modulus phase and a second low-shear modulus phase uniformly distributed within the high-shear modulus polyurethane matrix phase, wherein the first low-shear modulus phase is a first product of a thermoplastic elastomer, a wax, and a high-oleic oil, and wherein the second low-shear modulus phase is a second product of a silicone elastomer and a silicone oil.

16. The polyurethane-based, stress-localized ice-shedding coating of claim 15, wherein the polyurethane-based, stress-localized ice-shedding coating continues to demonstrate a similar level of ice adhesion after successive icing/deicing cycles, abrasion, water and air jets exposure, UV exposure, temperature exposure, or corrosive chemical exposure.

17. The polyurethane-based, stress-localized ice-shedding coating of claim 15, wherein the polyurethane-based, stress-localized ice-shedding coating demonstrates no substantial loss of thickness after 1000 abrasion cycles in an abrasion test.

18. The polyurethane-based, stress-localized ice-shedding coating of claim 17, wherein the polyurethane-based, stress-localized ice-shedding coating demonstrates at least 50% remaining thickness after 100,000 abrasion cycles in the abrasion test.

19. The polyurethane-based, stress-localized ice-shedding coating of claim 15, wherein the polyurethane-based, stress-localized ice-shedding coating demonstrates a pencil hardness of 6H and a shore hardness of 95, and a cross hatch durability of 5B.

20. The polyurethane-based, stress-localized ice-shedding coating of claim 15, wherein the polyurethane-based, stress-localized ice-shedding coating demonstrates no significant damage after a rain erosion test with a droplet impact speed of greater than 170 meters per second (m/s).

* * * * *